United States Patent [19]

Mackenzie

[11] Patent Number: 5,009,370
[45] Date of Patent: Apr. 23, 1991

[54] MUNICIPAL SOLID WASTE MATERIAL SORTING TROMMEL SYSTEM

[75] Inventor: Harold B. Mackenzie, Wheaton, Ill.

[73] Assignee: New Life Foundation, Wheaton, Ill.

[21] Appl. No.: 350,339

[22] Filed: May 11, 1989

[51] Int. Cl.$^5$ .......................... B02C 23/14; B07B 9/00
[52] U.S. Cl. ......................................... 241/24; 209/12;
209/19; 209/44.1; 209/241; 209/257; 209/284;
209/290; 209/630; 209/634; 209/683; 209/930;
241/81; 241/DIG. 38
[58] Field of Search ........................................ 209/1–3,
209/10, 12, 19–21, 30–37, 44, 44.1–44.3, 233,
234, 240, 241, 243, 247, 255, 257, 284, 288–290,
629, 630, 632, 634, 664, 683, 930; 44/589, 590,
605, 606; 110/219, 220, 222; 241/24, 68, 81,
DIG. 38

[56] References Cited

U.S. PATENT DOCUMENTS

| | | | |
|---|---|---|---|
| 442,765 | 12/1890 | Brennan, Jr. | 209/290 X |
| 772,331 | 10/1904 | Baxter | 209/289 |
| 1,284,872 | 11/1918 | Bryan | 209/12 |
| 3,233,836 | 2/1966 | Merges | 209/3 X |
| 4,018,675 | 4/1977 | Petrucci | 209/664 X |
| 4,044,695 | 8/1977 | Mackenzie et al. | 110/222 X |
| 4,095,956 | 6/1978 | Holmes | 209/667 |
| 4,778,061 | 10/1988 | Williams | 209/930 X |

FOREIGN PATENT DOCUMENTS

| | | | |
|---|---|---|---|
| 0173934 | 3/1986 | European Pat. Off. | 209/3 |
| 1011174 | 6/1952 | France | 209/44.3 |

*Primary Examiner*—Margaret A. Focarino
*Assistant Examiner*—Edward M. Wacyra

*Attorney, Agent, or Firm*—Hill, Van Santen, Steadman & Simpson

[57] ABSTRACT

A municipal solid waste material sorting system comprises a multi-stage trommel having a relatively short first stage section with relatively small holes for screening out grit, dirt, coins, small stones and the like, a second substantially longer second stage section for screening out beverage bottles, metal cans, and other waste materials of similar size and a third stage relatively short section for screening out large objects such as half gallon and gallon plastic, metal and glass containers. The respective screened municipal solid waste fractions from each of the three trommel sections are advantageously handled in respective handling streams. Materials screened in the first stage section of the trommel may be further classified as by a vibrative air table-specific gravity device to recover useful materials, such as glass cullet and coins. Materials screened in the second stage of the trommel may be further screened in a two-section disk screening and air classification arrangement. Materials screened in the third section of the trommel are further classified by manually sorting large size objects, particularly half-gallon and gallon size metal, glass and plastic containers to a take-away conveyor for further processing. Unsorted materials from the third trommel section are directed by a U-turn conveyor system to a larger conveyor which also receives the largest oversize materials discharged from the low, discharge end of the trommel. This large conveyor feeds to a shredder from which the shredded material may be directed to a point of use or a reserve discrete storage facility.

18 Claims, 1 Drawing Sheet

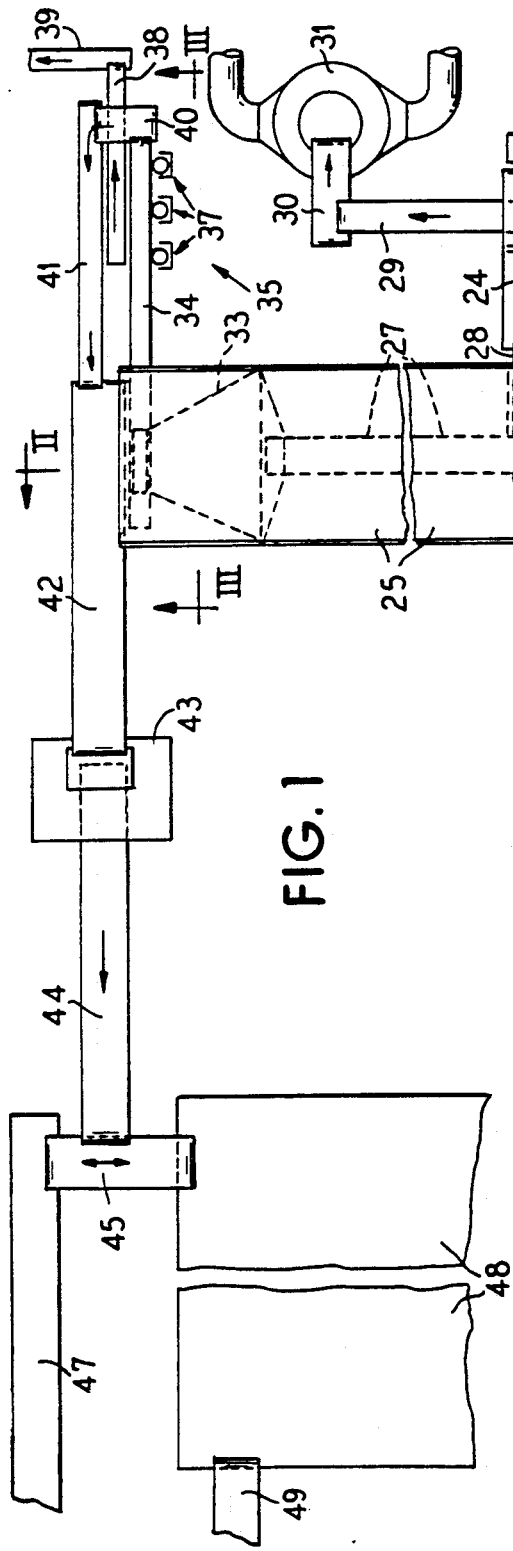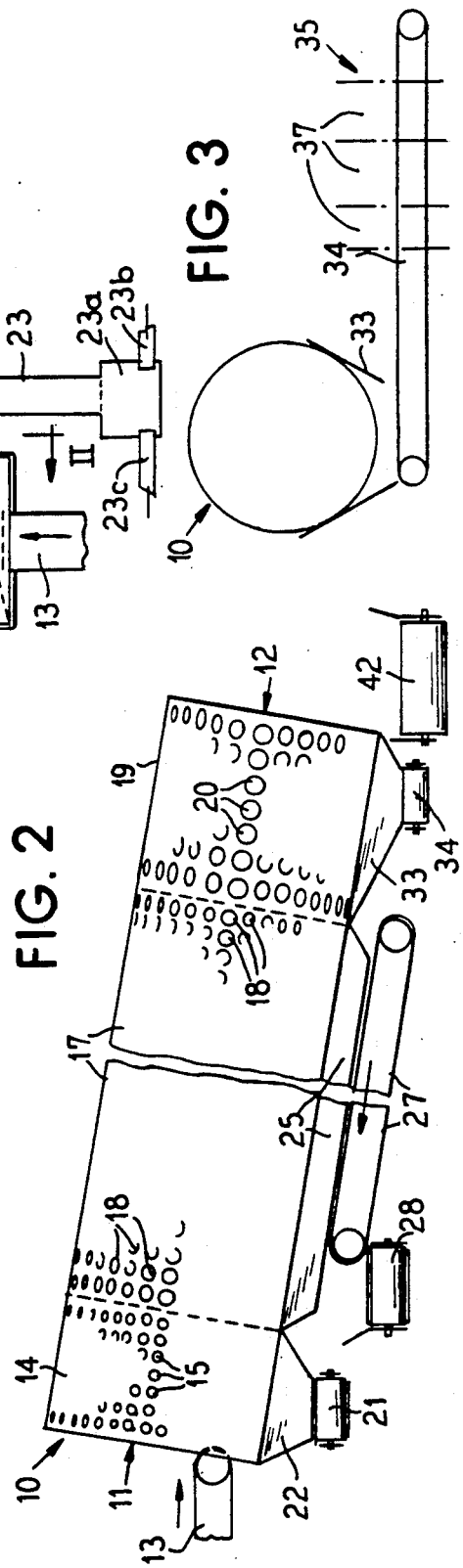

MUNICIPAL SOLID WASTE MATERIAL SORTING TROMMEL SYSTEM

BACKGROUND OF THE INVENTION

The present invention relates to improvements in municipal solid waste material sorting systems, and is more particularly concerned with sorting or classifying such waste whereby to facilitate recovery of various useful fractions thereof, including metals, glass and plastic containers.

Disposal of municipal solid waste material creates an enormous problem in most communities, and the larger the communities and the more dense the population, the larger the problem. In many communities landfill or dumping sites are becoming exhausted, and new landfill sites are often not conveniently available and are nearly always difficult, if not impossible, to find. Incineration or "mass burning" is frequently resorted to, but is unsatisfactory in many respects compared to processing or classifying of municipal solid waste to sort out useful fractions, as herein. Incineration requires large expenditures of energy, is usually a very wasteful manner of waste disposal, and often creates new disposal problems because incinerator ash contains materials which can require the ash to be classified as hazardous waste.

There have been numerous examples of prior classification systems according to which various sizes of the same material such as ore, coal and the like are graded. However, municipal waste because of its heterogenous nature presents special problems for the attainment of reasonable efficiency and acceptably economical methods and means for the separating of useful fractions from the large tonnages of municipal waste materials generated on a continuous basis.

Although municipal solid waste contains some materials for which there may be no immediate recyclable value and which must therefore go to landfill, a major percentage of municipal solid waste may be recovered and with economical separation contribute various valuable source materials such as, but not limited to, combustibles including paper, cardboard, certain plastics, wood, yard wastes, fabric, and the like; fibrous materials that can be recycled into roofing felt or new corrugated cardboard; recyclable materials such as plastic, glass and metal containers; miscellaneous metal scrap, and the like.

U.S. Pat. No. 4,044,695 discloses a fairly elaborate multi-stage pneumatic municipal solid waste separation and recovery system capable of handling very large volume, primarily for separation into combustible and noncombustible fractions.

SUMMARY OF THE PRESENT INVENTION

An important object of the present invention is to provide a new and improved solid municipal waste separation or classifying system wherein large volume is adapted to be processed and in which, although fibrous and combustible materials are separated and prepared for fuel or other purposes, a substantial emphasis is placed upon efficient separation for recycling of other useful components such as glass, plastic and metal containers of various sizes, particularly those of large size, such as half-gallon and gallon containers.

Another object of the invention is to provide a new and improved mechanical solid waste material selection and separating system, employing primary trommel separation.

To this end the present invention provides a municipal solid waste material sorting system comprising a trommel having an intake at one end and being tilted downwardly toward an opposite discharge end, the trommel having a first stage minor length upper end section with relatively small size holes, followed by a second stage substantially longer intermediate section provided with substantially larger size holes and then a third stage lowest and relatively short section with largest size holes; there being means for delivering heterogeneous solid municipal waste into the intake end of the trommel. Means such as a first stage take-away conveyor receives for disposition solid waste material which drops through the first stage smallest size holes of the first stage section of the trommel, and may direct such materials to a specific gravity sorting and classifying means. Means such as a second stage take-away conveyor receives the second stage intermediate size solid materials such as beverage bottles, metal cans and other objects of similar size which drop through the larger size holes of the second stage section of the trommel, and may direct such materials to an interlocking-spaced rotating disc sorting and classifying means device and then to an air classifying tower means. Means such as a third stage take-away conveyor receives solid waste material such as half gallon and gallon metal, plastic and glass containers and the like, which drop through the largest size holes of the third stage trommel section, and this material travels through a manual sorting station where such largest size metal, plastic and glass containers are manually sorted to a take-away means such as a conveyor. Unsorted third stage materials received by the third stage sorting conveyor means are transported to a fourth stage transporting conveyor means which is also arranged for receiving and transporting to a shredder the largest materials discharged from the "trommel oversize" or fourth stage discharge end of the trommel. The fourth stage materials plus unsorted third stage materials, are conveyed to a shredder, and shredded materials may be conveyed to a discrete solid material fuel storage facility from which one or more boilers may be supplied with the discrete material serving as fuel; or the shredded discrete material may be conveyed directly to said boiler or boilers as fuel. The shredded materials now having a minimum content of glass, metals, plastic and other inorganics, and a maximum content of fibers and other organics, will have other uses such as in manufacture of new corrugated cardboard, roofing felt, or the like, and may also be composted to produce a compost product useful in agriculture and horticulture.

BRIEF DESCRIPTION OF THE DRAWINGS

Other objects, features, and advantages of the invention will be readily apparent from the following description of a preferred embodiment thereof, taken in conjunction with the accompanying drawing, although variations and modifications may be effected without departing from the spirit and scope of the novel concept of the disclosure, and in which:

FIG. 1 is a schematic plan view of a municipal solid waste material sorting trommel system, embodying features of the present invention;

FIG. 2 is an enlarged schematic side elevational detail view taken substantially along the line II—II in FIG. 1; and FIG. 3 is a schematic sectional detail view taken substantially along the line III—III in FIG. 1.

DETAILED DESCRIPTION

A municipal solid waste material sorting system, as schematically depicted in the drawing, comprises as a major component a trommel 10 which as best seen in FIG. 2 is tilted downwardly from an intake end 11 to a discharge end 12. The trommel 10 may also be referred to as a rotary screen, and as is well known this device comprises a generally large metal tube having peripheral perforations through which particulate solid material to be screened may drop as the trommel is rotated. Inasmuch as rotary drive means for trommels is well known, such drive means has not been shown herein; but it will be understood that the trommel 10 is equipped with drive means which cause the trommel to be rotated at a suitable speed for the volume of material to be screened. Desirably, the trommel is about ten feet in diameter, is up to sixty feet long and tilts downwardly at a slope which may be 5° to 10° from horizontal. Loading means such as a conveyor 13 is located for delivering heterogenous municipal solid waste material into the inlet or intake end 11 of the trommel.

As the waste material travels down the rotating trommel from the inlet 11, it first passes through a relatively short length (e.g. 8' to 10') first stage upper trommel section 14 having small holes 15, followed by a substantially longer (e.g. 40') intermediate, second stage trommel section 17 provided with substantially larger size holes 18 and then a third stage lowest end relatively short (e.g. 10' to 12') trommel section 19 with largest size holes 20. Preferably, the second stage section 17 may be about five to six times as long as the upper first stage section 14, and the lower third stage section 19 may be about one and one half times as long as the first stage upper section 14 and about one third as long as the second stage section 17. The holes 15 are desirably from two to two and a half inches in diameter, the holes 18 from five to six inches in diameter and the holes 20 from ten to twelve inches in diameter. In each section of the trommel the holes are disposed in an overall array and as close together as practical within structural constraints.

Respective handling stream means, or take-away conveyors, are provided for handling solid municipal waste fractions that drop respectively from the first stage, second stage and third stage trommel sections 14, 17, and 19.

From the trommel section 14 small particulate materials such as grit, dirt, small stones, small glass particles, coins and other small materials may drop through the small size holes 15 and be received for disposition by a handling stream means such as a conveyor 21 to which the material is guided by funnel means 22 associated with the section 14. Material from the conveyor 21 may be delivered by a take-away conveyor 23 to a further processing means, such as a vibrating air table-specific gravity separator means 23a. The specific gravity separator means 23a classifies out useful secondary commodity materials such as coins, small metal pieces and glass cullet which may be carried away by a conveyor 23b, and the remaining first stage separated materials conveyed further as by conveyor means 23c for landfill disposal.

The largest volume of "trommel undersize" municipal solid waste materials classified in the trommel will be in the midsize range which will drop through the five to six inch openings 18 in the major length second stage trommel section 17. As the material drops from the section 17, it is guided by a generally funnel-like or directing chute structure 25 to a handling stream means including an endless conveyor 27 which deposits the material therefrom onto an endless take-away conveyor 28 which delivers the material therefrom onto the two-section disk screen 24 which further screens the material as to size, with a smaller first fraction of up to 2" or 2½" dropping through onto the endless conveyor 23, and the larger 5" to 6" fraction dropping from the disc screen 24 onto an endless conveyor 29. The smallest fraction from the disk screen, on conveyor 21, will desirably be combined with the smallest size fraction from the first stage of the trommel, the combined smallest size fractions proceeding together to the specific gravity separator. Conveyor 29 carries the larger intermediate size fraction of the material to an endless feed conveyor 30 that supplies the material to further classifying means such as a tower air classifier 31 which may be part of a classifying assembly such as in the aforesaid U.S Pat. No. 4,044,695. The relatively small volume of material that may be too large or too long to pass through the larger section of the disk screen 24 may be collected in an oversize material receiving bin 32 at the downstream end of the disk screen 24, for further classifying or shredding.

Waste materials larger than those which will pass through the openings in the intermediate, second stage trommel section 17 moves downstream to the lowest end, third stage trommel section 19 where the material up to a size range of ten to twelve inches will drop through the holes 20 and be directed by a generally funnel-like structure 33 to handling stream means comprising an endless sorting conveyor 34 which carries such material through a manual hand sorting station 35. At this station useful materials such as large glass, plastic and metal containers are manually sorted by a plurality of employee sorters 37 who deposit the sorted articles onto take-away means such as an endless conveyor 38 which may deliver the articles onto a take-away conveyor 39 for delivery to any desirable further processing station which may be equipped with electromagnet.

Material remaining on the sorting conveyor 34 is delivered to a generally U-turn conveyor system including a transfer conveyor 40 which receives the material from the conveyor 34 and delivers this material to a reversely running endless conveyor 41. From the conveyor 41, the material may be deposited onto a larger volume endless conveyor 42 which also receives the oversize materials from the discharge end 12 of the trommel. The combined volume of unsorted materials from both the sorting conveyor 34 and the trommel discharge end 12 is delivered by the conveyor 42 to a shredder 43. Shredded material is carried from the shredder 43 by means of an endless delivery conveyor 44 to a reversible conveyor means 45 which may be operated in one direction to deliver said shredded material to a delivery conveyor 47 which will carry said shredded material for final use as fuel or for use as a manufacturing raw material or for composting. By reversing the conveyor means 45, the shredded material may be delivered to a discrete solid material storage facility such as a storage building 48 from which the stored material may be supplied on demand to point of use by means such as a conveyor 49.

It will be understood that variations and modifications may be effected without departing from the spirit and scope of the novel concepts of the present invention.

I claim as my invention;

1. A municipal solid waste material sorting system comprising:

a multi-stage trommel having an intake at one end and being downwardly tilted toward an opposite discharge end;

said trommel having a first stage relatively short length upper end section with relatively small size holes, followed by a second stage substantially longer intermediate section provided with substantially larger size holes and then a third stage lowest end relatively short section with largest size holes;

means for delivering heterogenous solid municipal waste into said intake end;

means for receiving for transporting to a selected site waste materials which drop through said small size holes of said first stage means for further classifying at said selected site said materials which drop through said small size holes of said first stage section;

a further size screening device;

means for directing to said further size screening device materials which drop through said larger size holes of said second stage section;

means for classifying of materials screened by said further size screening device;

sorting conveyor means for receiving materials which drop through said largest size holes of said third stage section;

a manual sorting station through which said sorting conveyor means travels;

take-away means for receiving objects manually sorted from said sorting conveyor means;

means for transporting to a shredder unsorted material received from said sorting conveyor means; and said transporting means for transporting to said shredder also being arranged for receiving and transporting to said shredder largest size materials not passing through said largest size holes and discharged from said trommel discharge end.

2. A system according to claim 1, wherein said means for further classifying said materials which drop through said small holes of said first stage section comprises a specific gravity classifier.

3. A system according to claim 1, wherein said further size screening device and said means for classifying materials screened by said further size screening device comprise a disk screen and an air classifier, respectively.

4. A system according to claim 1, wherein said trommel intermediate second stage section is substantially longer, such as up to four or five times as long as said first stage section, and said third stage section is about one-fourth to one-third as long as said intermediate second stage section.

5. A system according to claim 1, wherein said first stage section holes are disposed in an overall array and are individually from two to two and a half inches in diameter, said holes in said second stage section are each from five to six inches in diameter and disposed in an overall array, and said holes in said third stage section are in an overall array and individually of about ten to twelve inches in diameter.

6. A system according to claim 1, wherein said means for receiving for transporting comprises a take-away conveyor.

7. A system according to claim 1, wherein said means for directing comprises a take-away conveyor and said means for classifying materials screened by said further size screening device comprises an air classifier device.

8. A system according to claim 1, wherein said transporting means comprises a substantially U-turn conveyor arrangement.

9. A system according to claim 8, wherein said U-turn conveyor arrangement discharges onto a relatively large-volume conveyor section which also receives the material discharged from said trommel discharge end, and discharges such materials into said shredder.

10. A system according to claim 1, including a reserve discrete solid material storage facility, and means for transferring shredded material from said shredder to said facility.

11. A municipal solid waster material sorting system comprising:

a multi-stage trommel having an intake at one end and being downwardly-tilted toward an opposite discharge end;

said trommel having a first stage relatively short minor length upper end section with relatively small size holes, followed by a second stage substantially longer intermediate section provided with substantially larger size holes and then a third stage lowest end relatively short section with largest size holes;

means for delivering heterogenous solid municipal waste into said intake end;

respective first, second and third handling stream means for handling the solid municipal waste material fractions that drop through said holes in respectively said first stage, second stage and third stage trommel sections;

a shredder;

means for conveying to said shredder waste material discharged from said discharge end;

said third handling stream means including a sorting station for enabling removal of selected waste material; and means for effecting transfer to said shredder from said third handling stream means of waste material not removed at said sorting station.

12. A municipal solid waste material sorting system comprising:

a multi-stage trommel having an intake at one end and being downwardly tilted toward an opposite discharge end;

said trommel having a first stage relatively short length upper end section having relatively small size holes, followed by a second stage substantially longer intermediate section provided with substantially larger size holes, and then a third stage lowest end relatively short section with largest size holes;

means for delivering heterogenous municipal solid waste material into said intake end;

means providing a first handling stream for material which drops from said first trommel stage section;

means providing a second handling stream for material which drops through said second trommel stage section;

means providing a third handling steam including sorting conveyor means for receiving material which drops from said third trommel stage section;

a shredder;

means for conveying to said shredder material discharged from said discharge end;

a manual sorting station associated with said sorting conveyor means for enabling removal of selected waste material; and means for transferring to said shredder from said sorting conveyor means waste material not removed at said manual sorting station.

13. In a municipal solid waste material sorting system, the method comprising:

delivering heterogenous municipal solid waste into the intake end of a multi-stage trommel tilted downwardly from the intake end toward an opposite discharge end;

in said trommel screening the material through a relatively short length upper end section having relatively small size holes, followed by screening the remaining material through a second stage substantially longer intermediate section provided with substantially larger size holes, and then screening said final remaining material through a third stage lowest end relatively short section having largest size holes;

in a first handling stream handling material which drops from said first trommel stage section;

in a second handling stream handling material which drops from said second trommel stage section;

in a third handling stream handling the material which drops from said third trommel stage section on a sorting conveyor means;

delivering to a shredder waste material discharged from said discharge end;

sorting out certain waste material at a manual sorting station along said sorting conveyor means; and transferring from said sorting conveyor means to said shredder waste material not sorted out at said manual sorting station.

14. In a municipal solid waste material sorting system, the method comprising:

delivering heterogenous municipal solid waste into a multi-stage trommel having an intake at one end and being downwardly tilted toward an opposite discharge end;

providing said trommel with a first stage relatively short length upper end section having relatively small size holes, followed by a second intermediate stage, substantially longer, section having substantially larger size holes, and then a third stage lowest end relatively short section having largest size holes;

conveying to a shredder waste material that is discharged from said discharge end;

handling in respective first, second and third handling streams municipal solid waste fractions that drop respectively from said first stage, second stage, and third stage trommel sections;

removing selected waste material in a sorting station in said third handling stream; and transferring from said third handling stream to the shredder waste material not removed at said sorting station.

15. In a municipal solid waste material sorting system, the method comprising:

delivering heterogenous municipal solid waste into the intake end of a multi-stage trommel which is tilted downwardly toward an opposite discharge end;

providing said trommel with a first stage relatively short length upper end section having relatively small size holes, followed by a second intermediate stage, substantially longer, having substantially larger size holes, and then a third stage lowest end relatively short section having largest size holes;

receiving for disposition solid waste material which drops through said smallest size holes of said first stage section;

receiving and screening material which drops through the larger size holes of said second stage section;

classifying the screened material;

receiving on a sorting conveyor the largest size material which drops through the largest size holes of said third stage section;

effecting travel on said sorting conveyor of the material thereon to a manual sorting station;

receiving on take-away means large container objects which are manually sorted from said sorting conveyor means;

transporting to a shredder unsorted material received from said sorting conveyor means;

and also transporting to said shredder material discharged from said trommel discharge end.

16. A method according to claim 15, which comprises transporting said unsorted material received from said sorting conveyor means to said shredder on a U-turn conveyor arrangement to a relatively large volume conveyor means, which large-volume conveyor means also receives the oversize material discharged from said trommel discharge end.

17. A method according to claim 15, which comprises transferring the shredded material from said shredder to means for selectively delivering such material to a reserve discrete solid material storage facility or directly to a point of use.

18. A method according to claim 15, which comprises classifying the solid waste material received for disposition from said smallest size holes of said first stag section.

* * * * *